United States Patent [19]

Uekusa

[11] Patent Number: 4,829,589

[45] Date of Patent: May 9, 1989

[54] ANTI-TAPPING SYSTEM

[75] Inventor: Tsutomu Uekusa, Funabashi, Japan

[73] Assignee: Kabushiki Kaisha Toshiba, Kawasaki, Japan

[21] Appl. No.: 56,775

[22] Filed: Jun. 2, 1987

[51] Int. Cl.$^4$ .................. H04B 1/06; H04K 1/00; H04L 9/02

[52] U.S. Cl. .................. 455/26.1; 340/825.34; 358/349; 380/23; 380/25; 380/46; 380/50

[58] Field of Search .................. 380/23, 25, 46, 50; 340/825.34; 358/349; 455/26.1

[56] References Cited

U.S. PATENT DOCUMENTS 4,578,531 3/1986 Everhart et al.
4,599,489 7/1986 Cargile.
4,716,586 12/1987 Bauer .................. 380/3

Primary Examiner—Stephen C. Buczinski
Attorney, Agent, or Firm—Foley & Lardner, Schwartz, Jeffery, Schwaab, Mack, Blumenthal & Evans

[57] ABSTRACT

The system relates to a system for preventing unauthorized viewing of CATV etc. wherein each terminal is provided with a terminal own address generator and an auxiliary address generator. The center station allows outputs of respective address generators to be sent thereto in conformity with a time map to compare a signal sent back from the center state with the own address and the auxiliary address of the terminal of concern. The center station confirms that there is no overlap of addresses of respective terminals to provide a receiving signal permission if an abnormal condition is not found.

Such an address overlap takes place at the time when the system is initially powered or when the pirater enters. Thus, when an overlap of addresses occurs, the address of the terminal concerned is changed. For such an address, an initial address is used as the own address, and an address based on the pseudo number is used as the address offset and the auxiliary address. Since the overlap when the system is initially powered is mainly due to the addresses attached at the time of fabrication at a factory, an address offset is added, thereby to cope with this overlap. In addition, since the overlap after the system has been powered is due to the enlargement or the invasion of the pirator, an address offset is changed or an address based on the pseudo number used to cope with such an overlap.

11 Claims, 10 Drawing Sheets

FIG. 3

| | FC01 | A01 | A11 | P03 |
|---|---|---|---|---|
| R11 | PSEUDO NUMBER TRANSMIT REQUEST COMMAND FLAG | INITIAL ADDRESS | ADDRESS OFFSET | PARITY |

| | FD01 | A01 | D01 | P01 |
|---|---|---|---|---|
| R01 | ADDRESS OFFSET SET COMMAND FLAG | INITIAL ADDRESS | ADDRESS OFFSET | PARITY |

| | F02 | A01 | A11 | P02 |
|---|---|---|---|---|
| R10 | PSEUDO NUMBER GENERATE ALLOWANCE COMMAND FLAG | INITIAL ADDRESS | ADDRESS OFFSET | PARITY |

| | FD11 | A01 | A11 | D11 | P12 |
|---|---|---|---|---|---|
| R12 | PSEUDO NUMBER COMPARISON REQUEST FLAG | INITIAL ADDRESS | ADDRESS OFFSET | PSEUDO NUMBER DATA | PARITY |

| | FD12 | A01 | A11 | D12 | P13 |
|---|---|---|---|---|---|
| R13 | ADDRESS OFFSET CHANGE REQUEST FLAG | INITIAL ADDRESS | ADDRESS OFFSET | NEW ADDRESS OFFSET VALUE | PARITY |

| | FD13 | A01 | A11 | D13 | P14 |
|---|---|---|---|---|---|
| R14 | CHANNEL MAP SET FLAG | INITIAL ADDRESS | ADDRESS OFFSET | CHANNEL MAP DATA | PARITY |

| | FD14 | A01 | A11 | A12 | D14 | P15 |
|---|---|---|---|---|---|---|
| R15 | DESCRAMBLE ALLOWANCE FLAG | INITIAL ADDRESS | ADDRESS OFFSET | PSEUDO NUMBER DATA | DESCRAMBLE KEY DATA | PARITY |

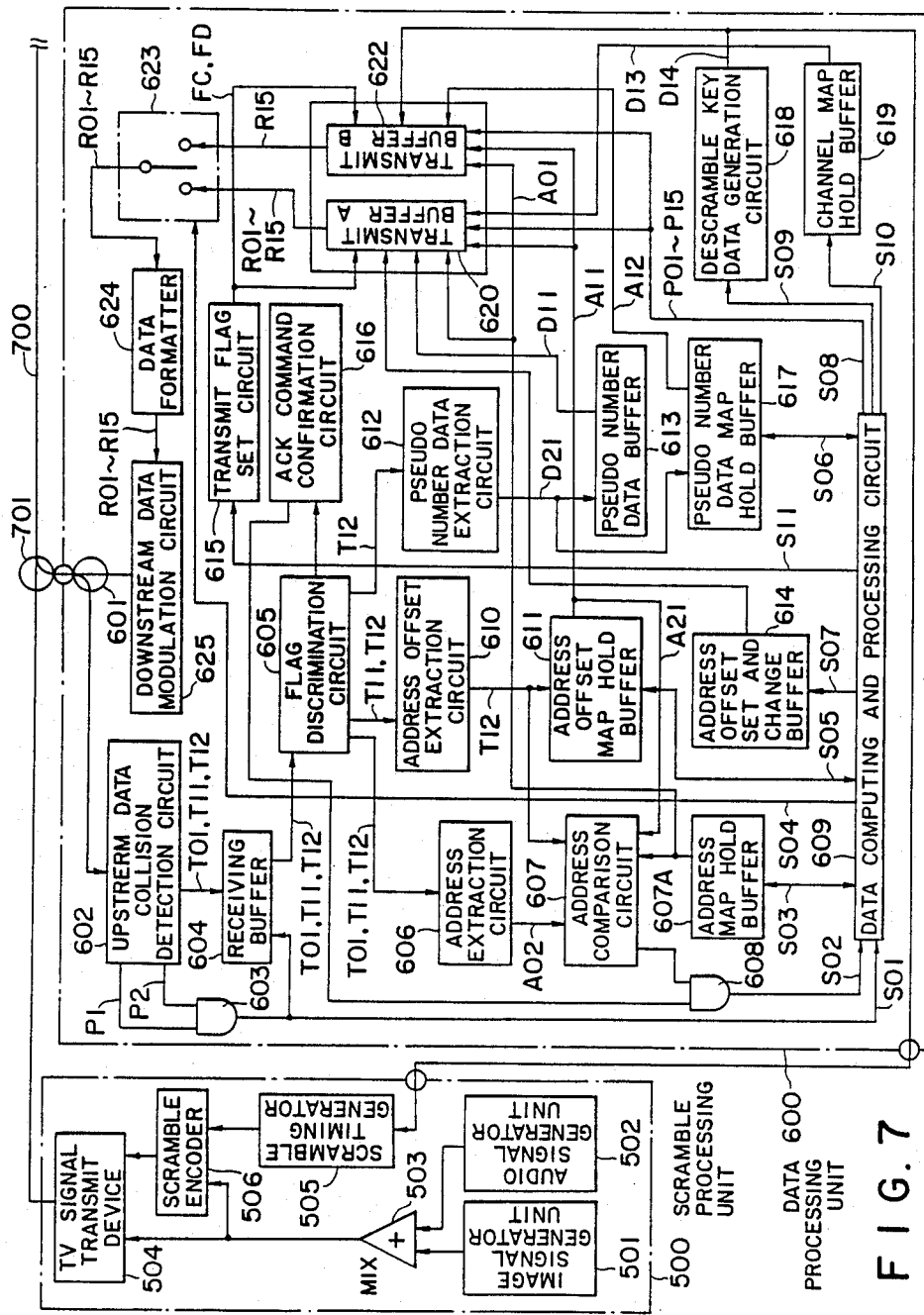

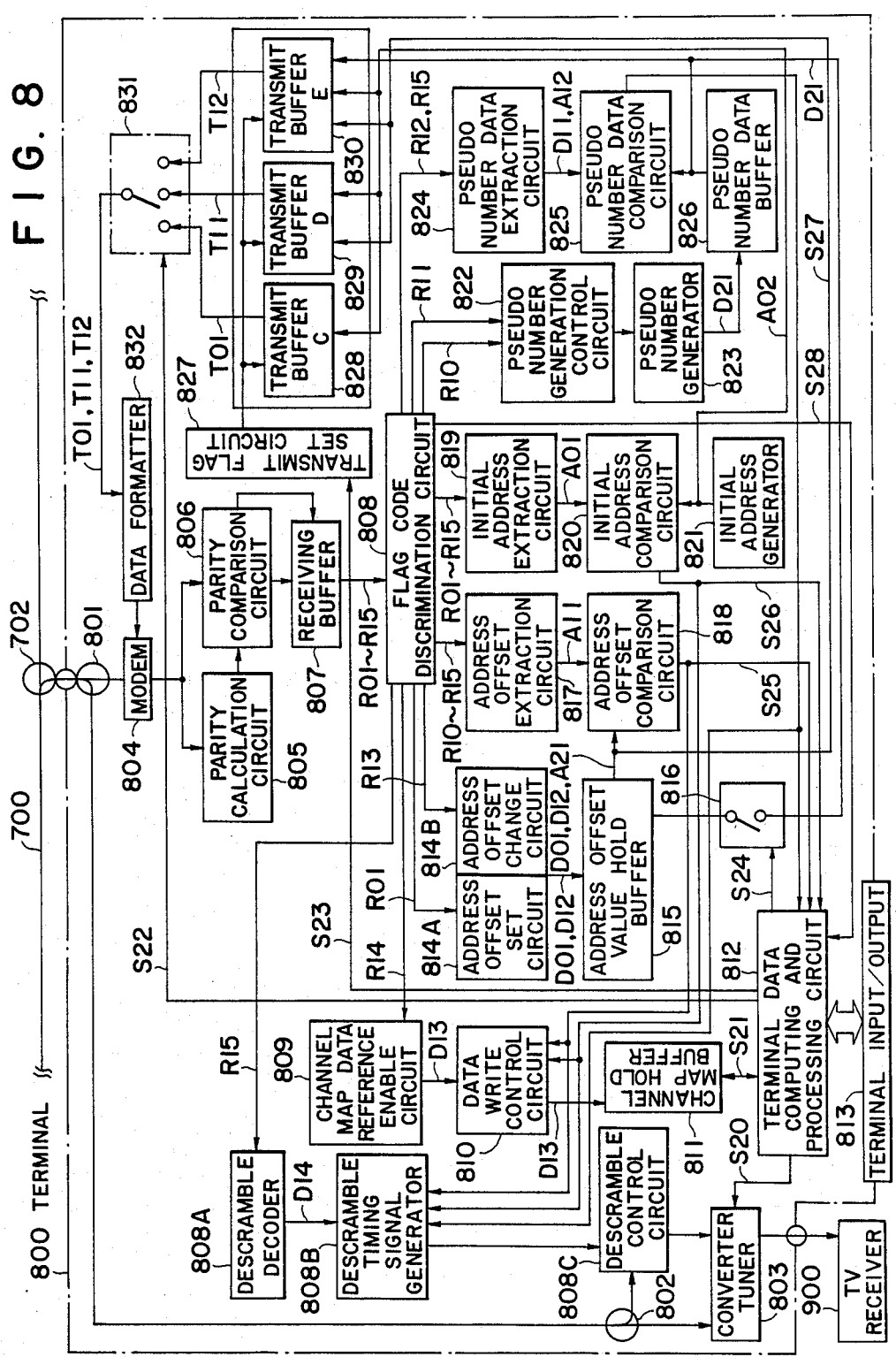

ANTI-TAPPING SYSTEM

BACKGROUND OF THE INVENTION

1. Technical Field of the Invention

This invention relates to an anti-tapping system for cable televisions, etc., and more particularly to an anti-tapping system capable of securely performing protection of tapping in bidirectional cable television systems.

2. Technical Background of the Invention and Problems Therewith

Generally, in a pay broadcast which provides programs to only subscribers, reception terminals are given their own addresses. In order to prevent a nonsubscriber from tapping a program, only when the coincidence of the addresses of a terminal is detected, the terminal is authorized to view the desired program. That is, the reception terminal having an address corresponding to a polling from the center sends an answer signal to the center, and the center responds to the answer signal to authorize the subscriber to view the desired program and performs processing such as fee-charging.

FIG. 11 is a block diagram showing a conventional anti-tapping system. The center 1 transmits a pay program signal through a trunk 2, and further bidirectional couplers 3 and 4 to the respective subscriber terminals 10 and 20. As an example, subscriber terminal 10 will be taken. A program signal transmitted downstream from the center is separated by a bidirectional coupler 11 and applied through a signal path 12 to a converter tuner 13 where the carrier wave of the received program is converted to a predetermined frequency and then applied to a TV receiver 14.

The converter tuner 13 performs the frequency conversion for only the subscriber concerned. At this time, whether the frequency conversion is permitted or not is controlled due to the fact that a data processor 15 transmits data to the center and receives it therefrom via a modem 16.

Usually, in the case of a pay broadcasting system, the center 1 loads a contracted channel map indicative of a contracted channel corresponding to the address of that subscriber down on each terminal. Each subscriber terminal makes reference to the contracted channel using its own address to control its converter tuner 13 for authorization operation thereof.

Namely, the contracted channel map loaded down by the center 1 using the address obtained by an address generator 17 of the terminal 10 is referenced. Unless the subscriber terminal 10 is authorized by the map thus referenced, the frequency conversion at the converter tuner 13 is stopped, or descrambling operation is stopped to prevent viewing of a pay program.

Charging for each subscriber's viewing of a pay program is processed at the center 1 by forming charging maps in RAMs of the data processors 15 in the respective subscriber equipment to collect them by polling.

As just described above, each contracted channel map showing the relationship between subscriber's address and contracted channel is stored and held by data processor 15 through a modem 16 using a downstream 18. The center 1 collects by polling the charging maps formed in the data processors 15 of the respective subscriber equipment through upstreams 19 to process them as the pay program viewing data.

The above conventional anti-tapping system prevents tapping using the respective terminal addresses alone, so that if a noncontractor steals the subscriber's address and causes an address generator 17 to produce that address, the following illegality will be performed.

It is assumed that the subscriber terminal 10 is a legal subscriber, and that a person of nonsubscriber terminal 20 uses the address of the subscriber terminal 10 by stealth. At the illegal nonsubscriber terminal 20, the converter tuner 13 is then authorized to view a pay program, so that the illegal nonsubscriber 20 can view the pay program illegally.

If the upstream 19 is shut down at the illegal nonsubscriber terminal 20, the transmission of the charging data in response to the polling by the center 1 is stopped and illegality is also performed in the charging operation.

Such illegal use of the subscriber's address is easily possible even if the address generator 17 is of a mechanical type such as a dip switch or of the type which is written into a ROM, so that the normal use of the system is hindered.

SUMMARY OF THE INVENTION

This invention has been made in view of the above problems, and its object is to provide an anti-tapping system which can prevent tapping even if the subscriber's address is used by stealth.

In an anti-tapping system for cable television systems, etc., according to this invention, pseudo number data generated by a pseudo number generator is added as an auxiliary address data to the subscriber's own address. The viewing of a program is authorized using the subscriber's own address and pseudo number data.

This prevents tapping due to stealth of the subscriber's own address.

BRIEF DESCRIPTION OF THE DRAWINGS

In the drawings:

FIG. 3 is an explanatory view of downstream data trains sent from the center station to respective terminals;

FIG. 7 is a block diagram for detailed explanation of the center station;

FIG. 8 is a block diagram for the detailed explanation of the terminal;

DETAILED DESCRIPTION OF THE EMBODIMENT

Figure 1:
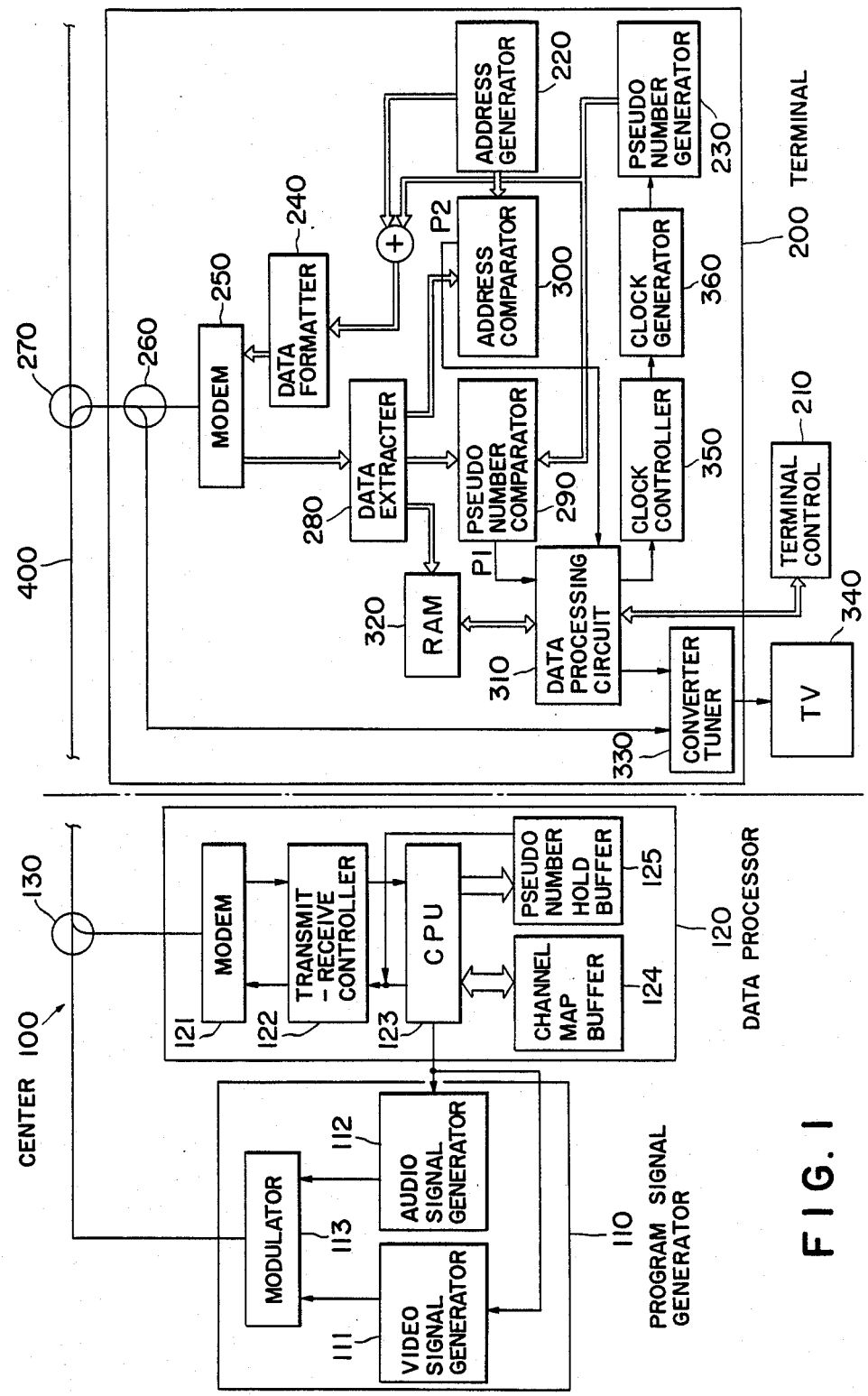
FIG. 1 is a block diagram showing the circuit of an anti-tapping system according to this invention.

An embodiment of this invention will now be described with reference to the drawings. FIG. 1 is a circuit diagram showing an embodiment of an anti-tapping system according to this invention. In FIG. 1, reference numerals 100 and 200 denote the center and a subscriber terminal, respectively. The center 100 includes a program signal generator 110 which generates program signals indicative of pay programs, etc., and a data processor 120. The program signal generator 110 includes a video signal generator 111 and an audio signal generator 112. The signals from these generators 111 and 112 are subjected to a predetermined modulation by a modulator 113 and then transmitted to the respective terminals.

On the other hand, the data processor 120 transmits data to the respective subscriber terminals and receives them therefrom, and also functions to control the respective terminals and to charge the respective terminals a fee for viewing, etc. These functions are performed based on the data processing by a CPU 123 through a modem 121 and a data transmit-receive controller 122. This CPU 123 executes data processing of a channel map buffer 124 and a pseudo number hold buffer 125. Formed in the channel map buffer 124 is a data map including data as to whether the pay programs are contracted in correspondence with respective subscriber terminal addresses. The pseudo number hold buffer 125 temporarily receives pseudo numbers generated at the respective subscriber terminals when the subscriber terminals are operated and then sends the pseudo numbers back to the corresponding subscribers. The sent-back pseudo numbers are used as data for preventing unfair tapping at the respective terminals. The operation for prevention of the unfair tapping using pseudo numbers at the side of the terminal subscriber will be described in more detail later.

The program signals from the program signal generator 110 and a series of transmission data produced by the data processor 120 are transmitted through a bidirectional coupler 130 to the subscriber terminals.

Then, the anti-tapping operation based on transmission and reception of data between the center and the subscriber terminals using pseudo numbers generated at the respective subscriber terminals will now be described.

When a terminal control 210 of the subscriber terminal 200 is operated for viewing a pay program, a data transmission request signal is sent to the center 100. In response to this, the center 100 sends a transmission permission signal back to the subscriber terminal 200 concerned. The establishment of such a communication procedure is performed, for example, using the basic mode control procedure and the high level data link control procedure. When the communication procedure is established, the subscriber terminal 200 responds to a command from the center 100 to format at a data formatter 240 its own address produced by an address generator 220 and a pseudo number from a pseudo number generator 230, and then sends the formatted data through a modem 250 and bidirectional couplers 260 and 270 to a trunk 400. The center 100 temporarily stores at the pseudo number hold buffer 125 the pseudo number data sent from the subscriber terminal 200. The center 100 makes reference to whether or not the subscriber has contracted a pay program channel which is desired to be viewed formed in the channel buffer 124 according to need and then sends the address of the subscriber terminal 200 as well as the corresponding pseudo number held in the pseudo number buffer 125 through the transmit-receive controller 122 back to the subscriber terminal 200.

At this time, the pseudo number sent back from the center 100 is extracted by a data extraction circuit 280 of the subscriber terminal 200. The pseudo number data extracted by the data extraction circuit 280 is compared by a pseudo number comparator 290 with the pseudo number sent by the pseudo number generator 230. When the pseudo number data sent from the subscriber terminal 200 and the pseudo number data sent back from the center 100 are coincident with each other, the comparison result from the pseudo number comparator 290 is output to a terminal P1. In addition, the address produced by the address generator 220 of the subscriber terminal 200 and sent to the center 100 is compared by an address comparator 300 with the address sent back by the center 100. The comparison result from the address comparator 300 is output to a terminal P2. The respective comparison results from the pseudo number comparator 290 and address comparator 300 are sent to a data processing circuit 310. If the coincidence data in respect to the pseudo number and the address is obtained at the data processing circuit 310, it is permitted to make reference to data necessary to view a pay program such as a contracted channel map loaded down by the center 100 and stored in a RAM 320.

When viewing of the pay program is permitted, the data processing circuit 310 performs a control operation necessary to obtain a descrambled signal at the output of the converter tuner 330 from the pay program signal separated by the bidirectional coupler 260. This allows for the viewing of the pay program on a television receiver 340.

The scrambling processing applied to a pay program may be performed either based on the system of applying direct processing to a video signal e.g., applying an inversion processing to a video signal or based on a so-called jamming system to shift the carrier frequency of the video carrier wave. The processing for descrambling a scrambled pay program signal to permit the subscriber to view the pay program is executed at the data processing circuit 310 and the converter tuner 330 by making reference to a contracted channel map according to need.

In this invention, the converter tuner 330 may be authorized in accordance with the contracted channel map loaded down onto the subscriber terminal by the center instead of scrambling the pay program signal.

Namely, in this invention, the subscriber terminal 200 sends its own address and pseudo number temporarily to the center 100. The center 100 sends them back to the subscriber terminal 200. The subscriber terminal checks whether or not the sent and sent-back data coincide in respect of address and pseudo number. When the coincidence in respect of address and pseudo number is detected at the subscriber terminal, the subscriber terminal concerned is permitted to view a pay program. Even in the case whether there is a terminal which uses the terminal address illegally, the coincidence between the address sent to the center and the illegally used address will be detected, however, no coincidence in respect of pseudo number is detected. Thus tapping of a pay program by the terminal which has used the address illegally occurs prevented. This is because the pseudo number data serves as a kind of password key by handling as seeming address data the combination of the terminals own address and the pseudo number produced by the terminal even if the terminals own address is used illegally.

Figure 2:
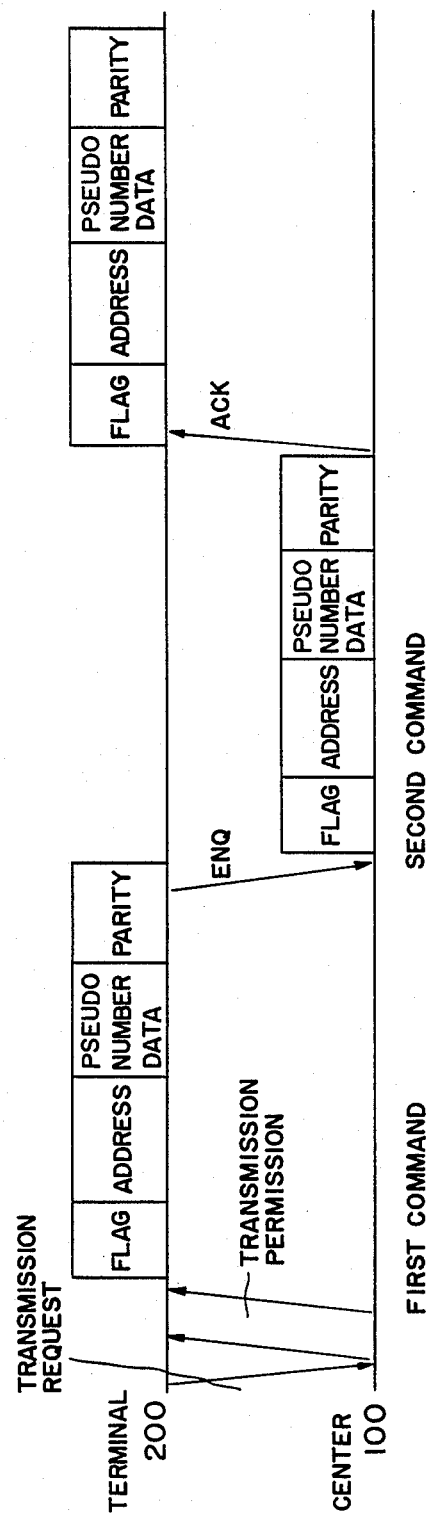
FIG. 2 is a data response diagram used for explanation of the operation of the FIG. 1 circuit.

FIG. 2 is a response diagram showing the transmission and reception of data between the terminals and the center in order to prevent tapping of the programs. First, when the terminal 200 initiates an operation to view a pay program, a transmission request signal is sent to the center 100. In response to this, the center 100 sends to the terminals 200 a transmission permission signal and a first command to require to send the terminal address and pseudo number data back to the center.

In response to this, the terminal having an address pertinent to the first command sends its own address and pseudo number data to the center 100.

The center 100 receives the data sent back from the terminal and again sends the data by means of a second command back to the terminal. At this time, the pseudo number data serves as an auxiliary address. The terminal which has received the data from the center compares both data indicative of address and pseudo number data with its own data. In this case, if there is a terminal which uses the address illegally, the terminal can receive data from the center 100 by the illegal use of the address. When this terminal compares its own data with that from the center, however, the coincidence between the pseudo number data at the terminal and the data from the center cannot be obtained. Thus, illegal tapping of the pay program is prevented.

While in the above embodiment the center 100 is described as sending back the data, which is transmitted from the terminal 200, as it is, if a pseudo number generating means of the pseudo number generator 230 is used by stealth, security against illegal tapping becomes a problem.

In order to cope with this problem, the center 100 may refer to time maps corresponding to the respective terminals without sending back the pseudo number data, which is sent from the terminals, as it is, and perform clock control of the respective pseudo number generators 230 at the terminals using the times determined by these maps. Namely, for a time period designated by the center 100, a pseudo number obtained by controlling a clock generation time produced by a clock generator 360 using a clock controller 350 may be used as an auxilliary address for a particular terminal. The control of a terminal by the center using this auxiliary address would prevent tapping of a pay program even if the pseudo number generation sequence of the pseudo number generator 230 is used by stealth.

FIG. 3 shows the format of downstream data trains sent from the data processing unit 600 of the center station to the terminal 800 wherein there are seven kinds of data trains labeled R01, R10, R11, R12, R13, R14 and R15.

These data trains are used in order to construct the system, respectively. At first, six data derived from the data train R01 are separately used in the case where the overlap of addresses is found out at the time when the system is initially powered, where the overlap of data is foundout at the time when the pirater enters, and where the overlap occurs during the use of the system, respectively.

These data trains will be explained in turn from R01.

Figures 4, 5:
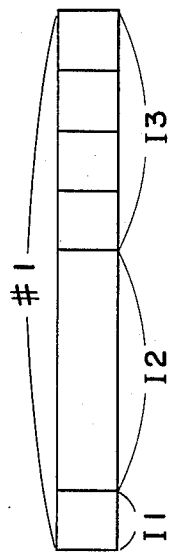
FIG. 4 is an explanatory view of upstream data trains sent from the terminal to the center station.
FIG. 5 is an explanatory view of the flag in the data train.

The data train R01 consists of an address offset set command flag FD01, an initial address A01, an address offset set data D01 and a parity P01. The address offset set command flag FD01 comprises, for example, such as shown in FIG. 5, a command and data discriminator 11, a command content 12, and a kind discriminator 13 of transmission data. The discriminator 11 indicates whether a signal which is to be sent is a command or data. Responding to this discriminator, the content of reception can be seen on the side of the terminal. In addition, the discriminator 13 shows the kind of data.

Following the address offset set command flag FD01, the initial address A01 is provided. The initial address includes numbers attached at the time of fabrication of the terminal, i.e., TV set. This address can be said as a physical address when viewed from its content. An address offset A11 serves to provide a countermeasure when there are provided a plurality of terminals where initial addresses overlap with each other. At the time when the system is initially powered, the overlap is confirmed. If the overlap is confirmed, the center station produces a command to use such a address offset.

Finally, the parity P01 for effecting error check follows.

The data train R10 is used when pseudo numbers are caused to be produced at terminals. In this data train, a pseudo number transmit request command flag FC01 and an address offset A11 are substituted for the address offset set command flag FD01 and the address offset set data D01, respectively. This data train serves to change the address of the terminal using a pseudo number when the overlap of not only initial addresses but also address offsets is produced, for example, due to the invasion of the pirater, thereby to prevent overlap of addresses. When this data train is sent to a terminal, the terminal effects the operation for generating pseudo numbers.

The data train R11 is used subsequently to the data train R10 in the case of causing the terminal to generate the pseudo number. This data train serves to change the address of a terminal using pseudo number when the overlap of not only initial addresses but also address offsets is produced, thereby to prevent the overlap of addresses. When such a data train is sent to a terminal, the terminal sends pseudo number data back to the center station.

The data train R12 serves to send data including the pseudo number data received from a terminal back to the terminal concerned by the designation of timing to make a comparison of the pseudo numbers. To this end, there are included therein a pseudo number comparison request flag FD11 and a pseudo number data D11.

The data train R13 is used in the case of providing an offset value to a terminal, for example, at the time of the enlargement of the system. This data train is characterized in that there are included therein an address offset change request flag FD12 and a new address offset value D12. This address offset value is used as a new offset value at the terminal.

The data train R14 serves to send a channel map to a terminal at the stage where the terminal has been recognized as a true receiving terminal. This data train is characterized in that there are included therein a channel map set flag FD13 and a channel map data D13.

Finally referring to the data train R15, this data train is used in the case of providing a descramble allowance or permission after a channel map has been sent to a true receiving terminal. This data train is characterized in that there are included therein a descramble allowance flag FD14 and a descramble key data D14.

FIG. 4 shows three kinds of upstream data trains sent from terminals to the center station in accordance with the downstream data trains from the center station, wherein these data trains are labeled T01, T11 and T12. When viewed in respect of the address data, the data train T01 is deemed as the most primitive one indicating the initial address as its content. The data train T11 is obtained by adding an address offset thereto, and the data train T12 is obtained by further adding a pseudo number thereto.

Namely, the data train T01 comprises an ACK command transmit flag FC03, an initial address A02, and a parity P03. The data train T11 comprises an ACK command transmit flag FC21, an initial address A02, an address offset A21, and a parity P21. The data train T12 comprises a pseudo number data transfer flag FD21, an initial address A02, an address offset A21, a pseudo number data D21, and a parity P22.

FIGS. 6A to 6E show the segmented portions of the communication sequence between the center stations and the terminal using various kinds of data trains which has been explained with reference to FIGS. 3 and 4, respectively.

Figure 6A:
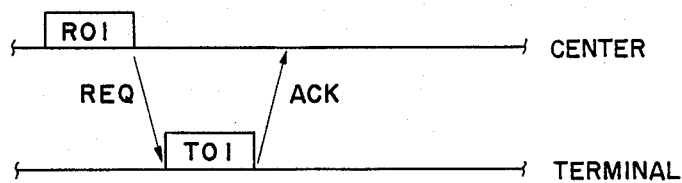
FIGS. 6A to 6E are explanatory views of the sequence using the data trains shown in FIGS. 3 and 4.
Figure 6B:
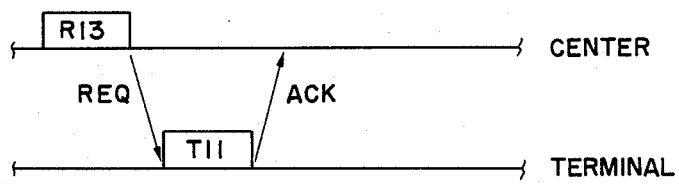

Initially, FIG. 6A shows an address offset set sequence. When the data train R01 is sent from the center station to a terminal, the data train T01 is sent back from the terminal as the ACK command. The data train R01 comprises an address offset set command flag FD01 and an address offset set data D01. Responding to them, the setting of the offset is made on the side of the terminal.

FIG. 6 shows an address offset change sequence used when the terminal addresses overlap with each other. When the data train R13 is set from the center station toward a terminal as the REQ command, the data train T11 is sent back from the terminal as the ACK command. In the data train R13, there are included an address offset change request flag FD12 and a new address offset value D12. The new address offset value is set on the side of the terminal.

Figure 6C:
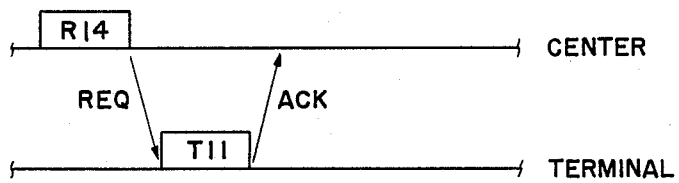

FIG. 6C shows a channel map transmit sequence executed when a terminal is authorized. The data train R14 is sent from the center station toward a terminal as the REQ command, and the data train T1 is sent back from the terminal as the ACK command. In the data train R14, there are included a channel map set flag FD13 and a channel map data D13. The terminal can receive a pay program using the channel map data.

Figure 6D:
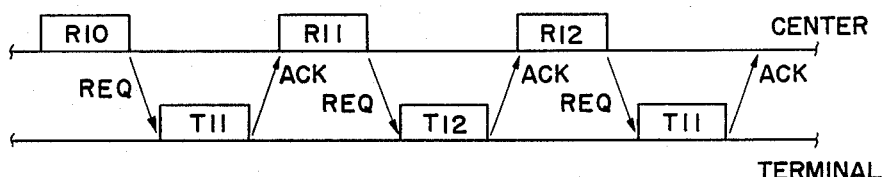

FIG. 6D shows a pseudo number comparison sequence in the case where a data train to which the pseudo number data is added is used for the reason of respective overlaps of the initial addresses and the address offsets. In this case, the REQ command is sent three times from the center station toward the terminal and the ACK command is sent back three times from the terminal to the center station. The data train R10 is first sent from the center station as the REQ command. Responding to this, the data train T11 is sent back from the terminal as the ACK command. By this procedure, the terminal is to be specified in principle. However, when the overlap of the terminal addresses is present, for example, due to the invasion of the pirator, such an overlap must be avoided using the pseudo number. Thus, the center station sends, to the terminal, the data train R11 which is the REQ command for sending the pseudo number. Responding to this, the terminal sends the data train T11 including the pseudo number data as the ACK command back to the center station. As a result, the center station is supplied with the pseudo number data and sends the data train R12 including this pseudo number to the terminal as the REQ command. The terminal compares the address data possessed by the terminal itself with the address data from the center station. As a result, when they are coincident with each other, the terminal effects the receiving operation. When otherwise, the terminal does not effect the same.

Responding to this receiving operation, the terminal sends the data train to the center station as the ACK command.

Figure 6E:
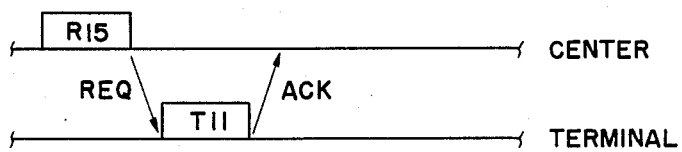

FIG. 6E shows a transmit sequence of a key data for descramble required for reception by the terminal. The center station sends the data train R15 including the descramble key data 14 to the terminal as the REQ command. Responding to this, the terminal sends back the data train T11 as the ACK command.

FIG. 7 shows the detailed configuration of the center station which comprises a scramble processing unit 500 for applying the scramble processing to a program signal, and a data processing unit 600 for effecting the timing control of the scramble processing and the transmission control of data. The scramble processing unit 500 corresponds to the program signal processing unit 110 of FIG. 1, and the data processing unit 600 corresponds to the data processing unit 120 of FIG. 1.

The scramble processing unit 500 mixes an image signal from an image signal generator unit 501 and an audio signal from an audio signal generator unit 502 using a mixer 503 to deliver the output thus mixed to a TV signal transmit device 504 and to a scramble encoder 506. The scramble encoder effects the scramble processing in accordance with the Sync offset system or the Sync suppress system, or a technique such as image inversion, which has been well known in the art. The program signal thus scrambled is transmitted to a main line 700 via the TV signal transmit device 504. A scramble timing generator 505 determines the timing for effecting, for example, the Sync offset scramble to form a timing signal in response to the output of the data processing unit.

The data processing unit 600 serves to perform bidirectional communication with a terminal shown in FIG. 8, and effects the processing of the downstream and upstream data and commands. An upstream data collision detection circuit 602 of the data processing unit 600 has an upstream data detection function to detect the collision of the upstream data from the terminal 800. The collision detection circuit 602 detects the overlap of addresses of the terminal 800 using the collision detection function. This upstream data collision detection circuit 602 will be described later in conjunction with FIG. 9. This circuit 602 detects whether a plurality of terminals are in the simultaneous responding states to detect the collision of the upstream data. If the collision has occurred, the address of the terminal is changed to avoid the collision of the upstream data.

The collision of the upstream data occurs in the case (1) where initial addresses of respective terminals, i.e., addresses attached at the time of fabrication of respective decoders partially overlap at the time when the system is initially powered and in the case (2) where the pirater which has stolen the subscriber address at the time when the system is initially powered.

When there is a collision in either case, its detection is made by the upstream data collision detection circuit 602. The output P1 of the collision detection circuit 602 indicates whether or not the length of the received data exceeds a predetermined value. The output P2 thereof indicates whether or not the parity detection is normally made. These outputs P1 and P2 are fed to an AND circuit 603. When there is a collision of the upstream data, the output S01 of the AND circuit becomes "0". The output S01 of the AND circuit 603 is fed to a receiving buffer 604 as well as a data computing and processing circuit 609. As a result, the receiving buffer 604 is supplied at the clear terminal CLR with a clear signal when the collision of the upstream data collision has been detected. At this time, upstream data T01, T11 and T12 which have been taken in the upstream data collision detection circuit 602 are cleared. The output S01 of the AND circuit is also fed to th data computing and processing circuit 609, whereby the operation for reception is blocked.

On the other hand, in the case where the collision of the upstream data is not detected by the upstream data collision detection circuit 602, the data T12 is once taken in the receiving buffer 604, and is then to the flag discrimination circuit 605. Then, the dat T12 is fed from the flag discrimination circuit 605 to an address extraction circuit 606, an address offset extraction circuit 610, a pseudo number data extraction circuit 612, and an ACK command confirmation circuit 616. Thus, codes in the data trains transmitted are taken out separately. The initial address of the data train from the terminal 800, which has been transmitted as the upstream data, is extracted by the address extraction circuit 606. The output A02 of the address extraction circuit 606 is fed to the address comparison circuit 607. In addition, initial sub-address, i.e., specific physical addresses according to another expression of respective terminals are held in the address map hold buffer 607A.

On the other hand, the address offset data which has been extracted at the address offset extraction circuit 610 is fed to the above-mentioned address comparison circuit 607. Namely, to the address comparison circuit 607, the initial address and the address offset which have been obtained via the upstream line are delivered. The initial address and the address offset which have been obtained via the upstream line are compared with data registered in advance in an initial address map hold buffer 607A and an address offset map hold buffer 611. The compared result is delivered to an AND circuit 608. As a result of comparison, when both inputs are not coincident, a "0" output is produced for the output S02, while when they are coincident, a "1" output is produced therefor. Thus, the data computing and processing circuit 609 performs the operation for reception or the operation for prevention of reception.

The comparison of the address by the above-mentioned address comparison circuit 607 is made only to the initial address when the system is initially powered. When there is competition of the initial addresses, such a comparison is also made to the address offset data in addition to the initial address.

The output D21 of the pseudo number data extraction circuit 612 is delivered to a pseudo number data buffer 613 for pseudo number comparison request, and to a pseudo number data map hold buffer 617. The pseudo number is transmitted via a downstream line where comparison is made at the terminal 800.

Various kinds of codes extracted are delivered to the address map held buffer 607A, the address offset map hold buffer 611 and the pseudo number data map hold buffer 617. These buffers are controlled respectively by outputs S03, S05 and S06 of the data computing and processing circuit 609 to deliver their outputs to a transmit buffer A, 620 and a transmit B, 622. In addition, the data computing and processing circuit 609 controls a descramble key data generation circuit 618 by the output S09 and a channel map hold buffer 619 by an output S10. Thus, the data computing and processing circuit 609 sends codes and key data of various data trains as well as a channel map as the service information to the terminal in accordance with the output S01 of the AND circuit 603 and the output S02 of the AND circuit 608. In sending them, the data computing and processing circuit 609 controls a transmit flag set circuit 615 by the output S11 to read data which have been stored in advance in two transmit buffers 620 and 622. Outputs of the address map hold buffer 607A, the address offset map hold buffer 611, the hold buffer 613 for the pseudo number comparison request, the address offset set and change buffer 614, and the channel map hold buffer 619 are delivered to these transmit buffers 620 and 622. In addition, an output of the descramble key data generation circuit 618 is delivered to the transmit buffer 622.

By operating a transmit data selector 623 using an output S04 of the data computing and processing circuit 609, switching of the transmit buffer A having data of low secret stored therein and the transmit buffer B having secret data stored therein is carried out. The data thus taken out is delivered to the bidirectional coupler 601 via a data formatter 624 and a downstream data modulation circuit 625, and is then transmitted to the terminal via the main line 700. The buffer A holds data to be transmitted in common to respective subscriber terminals as open data. The other buffer B holds data to be transmitted to specified subscriber terminals.

FIG. 8 shows an example of a terminal which communicates with the center station shown in FIG. 7, wherein this terminal communicates with the center station via the main line. Namely, the terminal 800 is connected to the main line 700 via a bidirectional coupler 702. A portion of the signal taken out from the bidirectional coupler 702 is delivered from the bidirectional coupler to a converter tuner 803 and a descramble control circuit 808C via another bidirectional coupler 802.

The descramble control circuit performs the operation corresponding to the scramble encoder 506 of the center station in FIG. 7 on the basis of the control signal from a descramable timing signal generation circuit 808B which will be described later. It delivers a control signal to the converter tuner 803 to deliver a TV signal to a TV receiver 900. An output S20 of a terminal data computing and processing circuit 812 connected to a terminal input/output device 813 to which an input such as a channel selection by the viewer is fed is also delivered to the converter tuner 803. The output S20 is used for the operation of control in conjunction with the control signal from the above-mentioned descramble timing circuit 808B.

On the other hand, another signal which has been taken out from the bidirectional coupler 801 is delivered to a parity calculation circuit 805 and a parity comparison circuit 806. When parities are not coincident, a clear signal is delivered to the receiving buffer 807 to cancel the received signal. In contrast, when parities are coincident, the output of the receiving buffer 807 is delivered to a flag code discrimination circuit 808. The flag code discrimination circuit 808 delivers respective data outputs to the descramble decoder 808A, a channel map data reference enable circuit 809, an address offset extraction circuit 817, an initial address extraction circuit 819, a pseudo number generation permission confirmation circuit 822, and a pseudo number data extraction circuit 824.

Initially, the data train R15 is delivered to the descramble decoder 808A. The key data D14 extracted therefrom is delivered to the descramble timing signal generation circuit 808B.

Respecitve outputs of an address offset comparison circuit 818, an initial address comparison circuit 820, and a pseudo number data comparison circuit 825 are delivered to the descramble timing signal generation circuit 808B to effect the control operation. Thus, the descramble timing signal generator 808B generates a timing signal necessary for the descrambling operation.

The data train R14 is delivered to the channel map reference enable circuit 809. The output D13 extracted therefrom is delivered to a data write control circuit 810. The data write control circuit 810 responds to outputs of the address offset comparison circuit 818 and the initial address comparison circuit 820 to effect a control for writing the output D13 into the initial address comparison circuit 820. The contents of the channel map hold buffer 811 are processed by the output S21 of the terminal data computing and processing circuit 812.

The data train R01 is delivered from the flag code discrimination circuit 808 to the address offset set circuit 814A to produce an output D01. The output D01 thus produced is delivered to an address offset value hold buffer 815. To the address offset value hold buffer 815, an output D12 which the address offset change circuit 814B has taken out from the data train R13 from the flag code discrimination circuit 808 is also delivered. When an output of a pseudo number data buffer 826 is supplied via a data transfer control circuit 816 controlled by a signal S24 from the terminal data computing and processing circuit 812, the address offset hold buffer 815 stores it as a changed address offset value. Outputs D01, D12 and A21 of the address offset value hold buffer 815 are delivered to an address offset comparison circuit 818. The address offset comparison circuit 818 compares an output of the address offset value hold buffer 815 with an output ALL of an address offset extraction circuit 816, thereby to detect coincidence or anticoincidence. The compared result S25 is delivered to the terminal data computing and processing circuit 812, the descramble timing signal generator 808B, and the data write control circuit 810. In the case of the coincidence output, the descrambling and the channel map referencing are blocked. Thus, no receiving is conducted.

Similarly, the receiving operation is blocked also by the output S26 of an initial address comparison circuit 820. The initial address comparison circuit 820 compares the output A01 of the initial address extraction circuit 819 with the output of the initial address generator 821 to detect coincidence or anticoincidence. All data trains are delivered from the flag code discrimination circuit 808 to the initial address extraction circuit 819.

Further, blocking of the receiving operation is carried out also by the output S27 of a pseudo number data comparison circuit 825. The pseudo number data comparison circuit 825 compares the output of a pseudo number data extraction circuit 824 to which data trains R12 and R15 are delivered from the flag code discrimination circuit 808 with the output of a pseudo number data buffer 826. The pseudo number data buffer 826 responds to the output of a pseudo number generation control circuit 822 which generates a pseudo number generation command when data trains R10 and R11 are delivered from the flag code discrimination circuit 808 to hold pseudo numbers that a PN generator generates.

In addition, blocking of the receiving operation is carried out also by the output S28 of the flag code discrimination circuit 808. This output is produced when the flag code discrimination circuit 808 has received the pseudo number transmit request command. The fact that the circuit 808 has received this command means that the overlaps of the initial addresses and the address offsets have occurred. In this case, it is required to avoid such overlaps using the pseudo number. To this end, the receiving operation is blocked.

The output of the above-mentioned initial address generator 821 is delivered to transmit buffers 828, 829 and 830. The output S27 of the above-mentioned address offset hold buffer 815 is delivered to the transmit buffers 829 and 830. In addition, the output of the above-mentioned pseudo number data buffer 826 is delivered to the transmit buffer 830.

Respective outputs of these buffers are taken out by the data formatter 832 via the transmit data selector 831 and are sent to the main line 700 via a MODEM 804 and couplers 801 and 702. A data selector 831 is controlled by the terminal data computing and processing circuit 812, whereby one of three transmit buffers is selected. At this time, a transmit flag set circuit 827 responds to the control signal S23 by the terminal data computing and processing circuit 812 to set flags of respective buffers. Thus, one of three kinds of ACK commands shown in FIG. 4 is selected and sent.

An apparatus shown in FIG. 8 effects the processing dependent upon whether the selected channel input from the terminal input/output unit 813 is the ordinary contract channel or the pay contract channel. Responding to the signal S20, when the ordinary contract channel is selected, a frequency control is conducted to inhibit the input from the descramble control circuit 808C to the converter tuner 803 to directly input the TV signal from the coupler 801 to output it to a TV receiver 900. In contrast, when the pay channel is selected, a frequency control is conducted, in a manner opposite to the above, to inhibit the direct input from the coupler 802 to output to the TV receiver 900 the input signal from the descramble control circuit 808C to the converter tuner 803.

Figure 9:
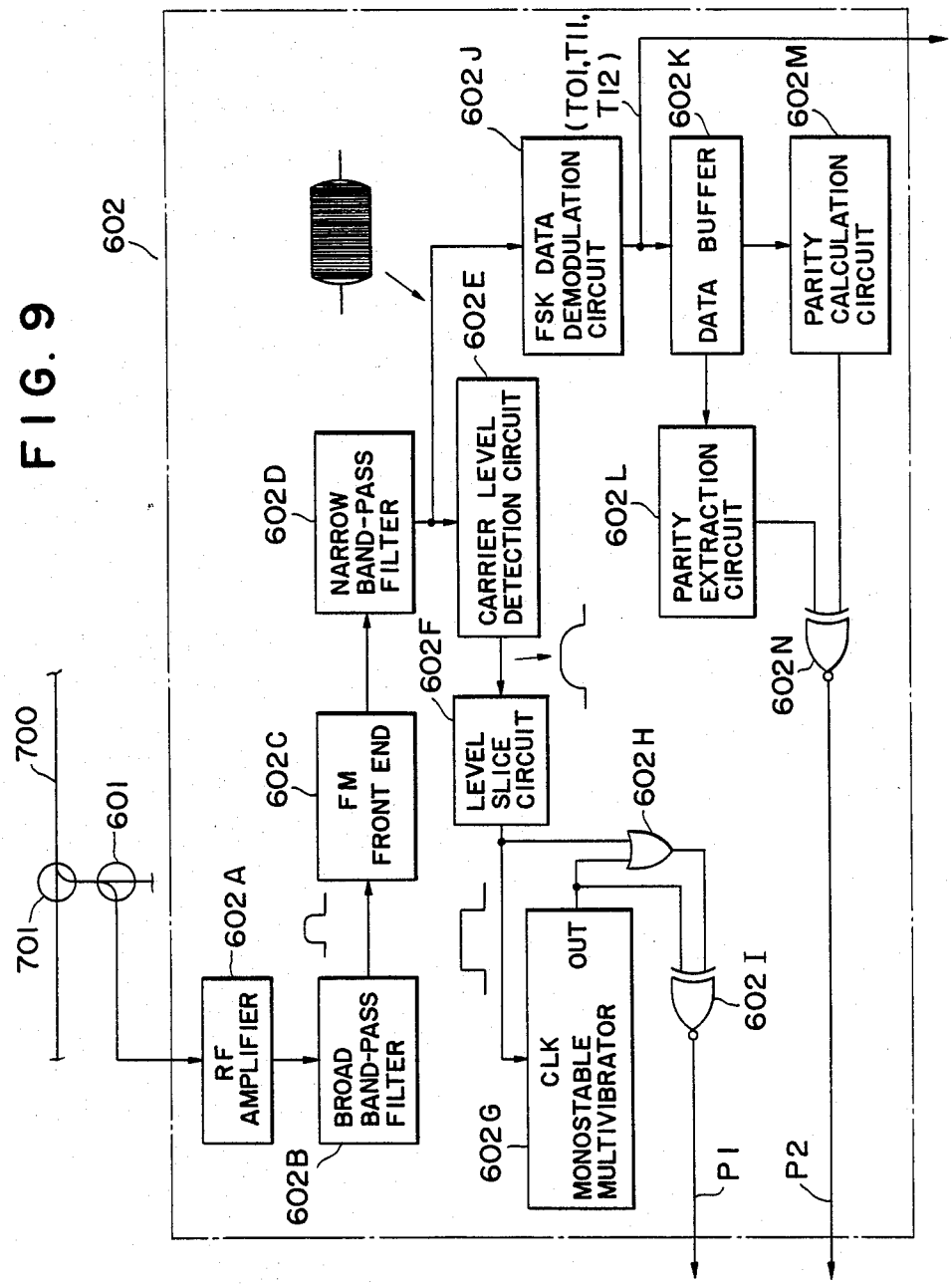
FIG. 9 is a circuit diagram showing the detail of the upstream data collision detector circuit in the circuit of FIG. 7.

FIG. 9 shows a detailed circuit configuration of the upstream data collision detection circuit 602 provided in the center station. In the upstream data collision detection circuit 602, the format sent from the terminal via the bidirectional couplers 701 and 601 is amplified at a RF amplifier 602A. Then, the format thus amplified is subjected to the band selection at a broad band-pass filter 602B and is then converted into an intermediate frequency signal at an FM front end 602C. Only a necessary frequency portion of the intermediate frequency signal is taken out at a narrow band-pass filter 602D and is then delivered to a carrier level detection circuit 602E and an FSK data demodulation circuit 602J.

The carrier level detection circuit 602E detects the carrier to deliver its output to a level slice circuit 602F to obtain a rectangular wave. The rectangular wave is delivered to a monostable multivibrator 602G and to an OR gate 602H. Since the monostable multivibrator 602G outputs a signal continuing for a predetermined time from the rise of the rectangular wave, the output of the monostable multivibrator always has a duration equal to or more than the output of the monostable multivibrator 602G. The outputs of the monostable multivibrator 602G and the OR gate 602H are delivered to an exclusive NOR 602I. The exclusive NOR 602I produces "0" output when the duration of the output of the level slice circuit 602F exceeds the duration of the output of the monostable multivibrator 602G. In contrast, in the case of the relationship opposite to the above, the exclusive NOR 602I maintains "1" output.

On the other hand, the output of an FSK data demodulation circuit 602J includes formats T01, T11 and T12. This output is delivered to the receiving buffer (FIG. 7) which is not shown here and is also delivered to a data buffer 602K for parity calculation. The data train is delivered from the data buffer 602K for parity calculation to a parity extraction circuit 602L. Thus, the parity data is taken out therefrom and the parity is calculated by a parity calculation circuit 602M. Outputs of the both circuits are delivered to an exclusive NOR 602N to check whether or not they are coincident. The exclusive NOR 602N produces "0" output in the case of anticoincidence in the same manner as the output of the exclusive NOR 602I.

Outputs of the exclusive NOR 602I and the exclusive NOR 602N are both delivered to the AND gate (FIG. 7).

Figure 10:
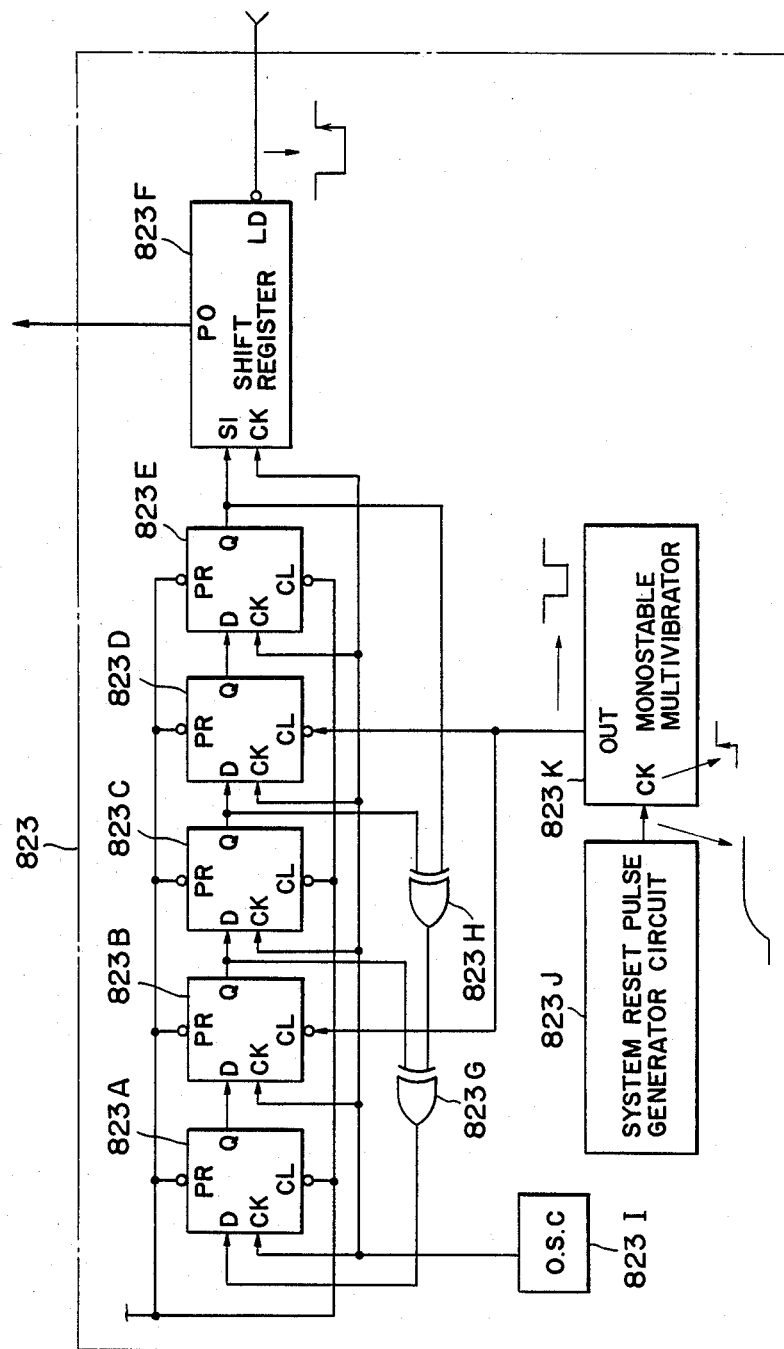
FIG. 10 is a circuit diagram showing the detail of the PN generator in the circuit of FIG. 8.
Figure 11:
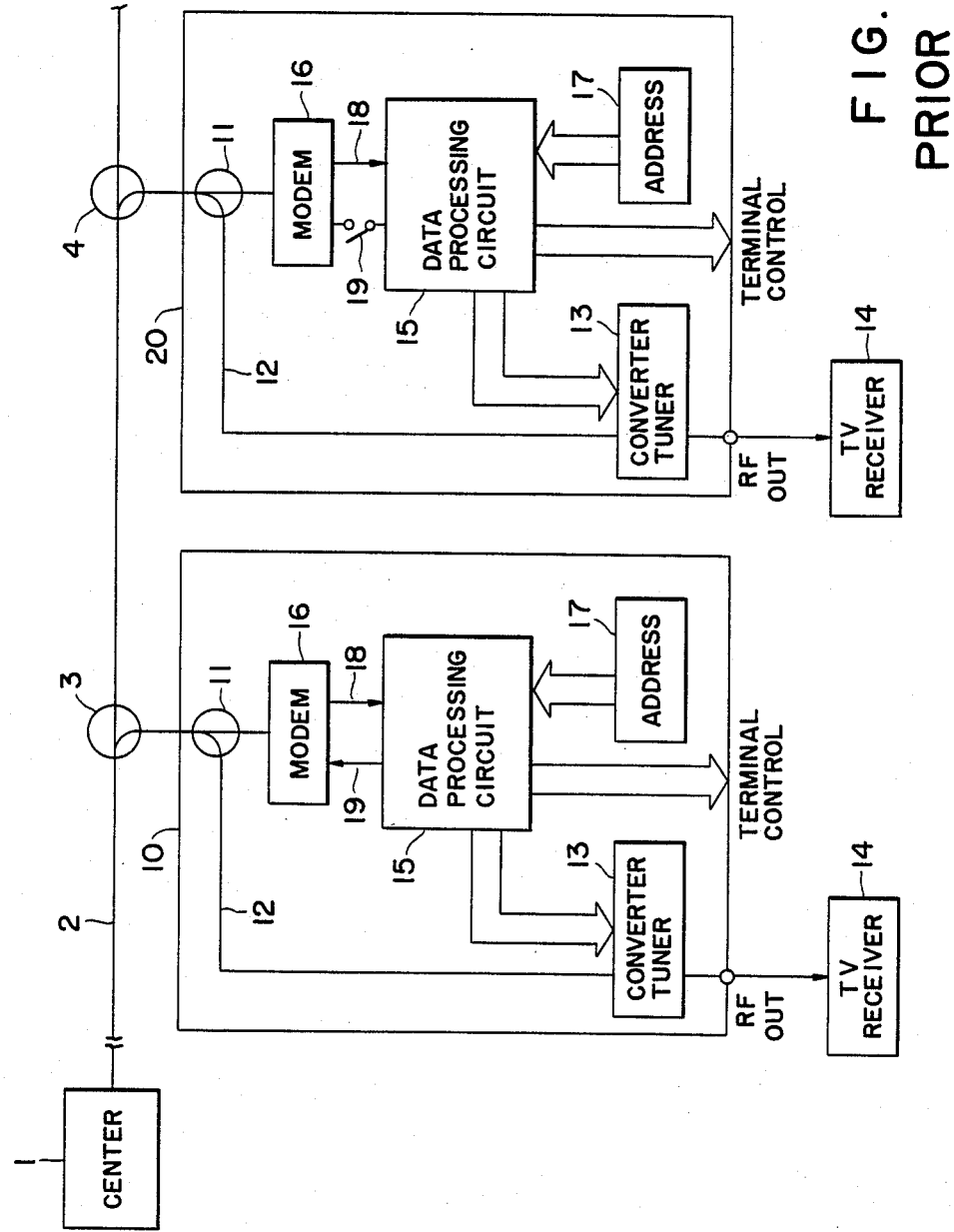
FIG. 11 is a block diagram showing the circuit of a conventional anti-tapping system.

FIG. 10 shows a detailed circuit configuration of the P.N. generator 823 in FIG. 8. This generator is called M-series pseudo number generator. The arrangement shown comprises five stages of flip-flops 823A to 823E, a shift register 823F, exclusive NORs 823G to 823H, a clock generator 823I, a system reset pulse generator circuit 823J, and a monostable multivibrator 823K.

The P.N. generator 823 serves to place the system in reset state for a predetermined time at the starting time of the system, e.g., at the time of insertion of the AC plug by a starting circuit constituted with the system reset pulse generator circuit 823J and the monostable multivibrator 823K which are operated in response to a command from the center station. The P.N. generator 823 delivers an output of the multistage flip-flop which is operated at a predetermined cycle determined in dependence upon which stages are connected to the exclusive NDRs 823G and 823H to the serial input Si of the shift register 823F, thereby to obtain a serial signal. A pseudo number output based on the serial signal appears on the P.O. terminal.

A permission signal from the pseudo number generation permission confirmation circuit 822 (FIG. 8) is delivered to the LD terminal of the shift register 823F. Responding to this, the output D21 is delivered to a pseudo number data buffer 826.

In accordance with the present invention, the center station is not provided with a special configuration for specifying respective terminals and each terminal itself is instead provided with such a configuration. Accordingly, this allows the system configuration to be simplified.

As described above, in an anti-tapping system according to this invention, the use of pseudo number data produced by the respective terminals as an auxiliary address to the terminal's own addresses will prevent tapping of a pay program even if the terminal's own address is used by stealth.

What is claimed is:

1. An anti-tapping system in which a center distributes program signals to a plurality of terminals, together with a reception permitting data based on an address of a respective terminal, and in the respective terminal, the reception of a desired program is permitted when an address sent from the center coincides with the address of the respective terminal, the respective terminal comprising:

means for generating an inherent address, and
means for generating an auxiliary address to be attached to said inherent address in response to an auxiliary address generation request signal sent from the center, wherein said center comprises:

means for transmitting said auxiliary address generation request signal to the respective terminal based on the inherent address of the respective terminal, and means for transmitting said reception permitting data to the respective terminal based on the inherent address and the auxiliary address.

2. A system as set forth in claim 1 wherein said auxiliary address generator generates a pseudo number.

3. A system as set forth in claim 1 wherein said means for generating the inherent address of a terminal comprises means for generating an initial address inherent to each terminal and a register means for storing an address offset sent from the center for imparting an offset to said initial address, and said center further comprises means for transmitting an address offset to a terminal based on the initial address.

4. A system as set forth in claim 5 wherein said generation request signal transmitting means provided in the center transmits said generation request signal to any one of said terminals at a time when a duplication of the inherent address of the terminal is detected by the center.

5. A system as set forth in claim 3 wherein said address offset transmitting means in the center transmits said address offset to a terminal having an initial address, when a duplication of the initial address is detected by the center.

6. A system as set forth in claim 5 wherein when duplication of the initial address and the address offset is detected, said generation request transmitting means in the center transmits the generation request signal to the terminal having the initial address and the address offset.

7. A system as set forth in claim 1 wherein said generation request transmitting means in the center transmits said generation request signal to the respective terminal at a predetermined time according to a time map.

8. A system as set forth in claim 3 wherein said address offset transmitting means transmits said address offset to the respective terminal at a predetermined time according to a time map.

9. A system as set forth in claim 5 wherein said generation request transmitting means in the center transmits said generation request signal to the respective terminal at a predetermined time according to a time map.

10. A system as set forth in any of claims 1–9 wherein said reception permitting data is a descramble key code data converted based on said auxiliary address.

11. A system as set forth in any of claims 1–9 wherein said reception permitting data is a channel map data.

* * * * *